(12) United States Patent
Gossen et al.

(10) Patent No.: US 11,660,579 B2
(45) Date of Patent: May 30, 2023

(54) AIR LANCE FOR REMOVING PELLETS FROM TUBES

(71) Applicant: Tubemaster, Inc., Louisville, KY (US)

(72) Inventors: Paul D Gossen, Louisville, KY (US); Dennis Patrick McAndrews, Jeffersonville, IN (US); Clifford L Johns, Louisville, KY (US)

(73) Assignee: Tubemaster, Inc., Louisville, KY (US)

( * ) Notice: Subject to any disclaimer, the term of this patent is extended or adjusted under 35 U.S.C. 154(b) by 0 days.

(21) Appl. No.: 17/380,186

(22) Filed: Jul. 20, 2021

(65) Prior Publication Data

US 2022/0008883 A1    Jan. 13, 2022

Related U.S. Application Data

(63) Continuation-in-part of application No. 16/816,939, filed on Mar. 12, 2020, now Pat. No. 11,406,955.

(60) Provisional application No. 62/825,836, filed on Mar. 29, 2019.

(51) Int. Cl.
*B01J 8/00* (2006.01)
*B01J 8/06* (2006.01)

(52) U.S. Cl.
CPC .............. *B01J 8/002* (2013.01); *B01J 8/06* (2013.01)

(58) Field of Classification Search
CPC ... B01J 8/004; B01J 8/003; B01J 8/002; B01J 8/0025; B01J 8/0015; B01J 8/06; B01J 2208/00761; B01J 2208/00769
See application file for complete search history.

(56) References Cited

U.S. PATENT DOCUMENTS

2022/0088554 A1*   3/2022   Sugimoto ................ B01J 4/002

\* cited by examiner

*Primary Examiner* — Lessanework Seifu
(74) *Attorney, Agent, or Firm* — Duncan Galloway Greenwald PLLC; Kevin T. Duncan

(57) ABSTRACT

An air lance for removing pellets from tubes includes a conduit body having an inlet end and a bottommost discharge opening, and a poker fixed relative to the conduit body and projecting beyond the bottommost discharge opening to serve as a spacer and poker; wherein a rigid member extends along said conduit body, such that that a hammering force applied to said rigid member where it extends outside of the tube will be transmitted through said rigid member to said poker for dislodging and breaking pellets.

20 Claims, 14 Drawing Sheets

Reference number amended to 31 in place of 52, which is used to refer to rod 52 in Figure 8.

Reference number amended to 31 in place of 52, which is used to refer to rod 52 in Figure 8.

AIR LANCE FOR REMOVING PELLETS FROM TUBES

This application is a continuation-in-part, and claims priority from U.S. Ser. No. 16/816,939, filed Mar. 12, 2020, which claims priority from U.S. Ser. 62/825,836, filed Mar. 29, 2019, all of which are hereby incorporated herein by reference.

BACKGROUND

The present invention relates to a device for unloading catalyst or other pellets from tubes.

Many chemical reactors are essentially large shell and tube heat exchanger vessels, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with from 10 to 5,000 or more such tubes. In any of these reactor vessels, catalyst, typically in the form of pellets, may be loaded into the reactor to facilitate the reaction. The catalyst is replaced periodically.

The reactor tubes may be quite long, housed in a structure several stories tall. In order to replace the catalyst, the old, spent catalyst must first be removed from the reactor tubes. In the prior art, springs are first removed from the bottom of each tube in the reactor and then a fish tape is manually pushed up from the bottom of each tube to jostle the catalyst pellets and allow the catalyst pellets to fall out the bottom of each tube.

Sometimes, instead of poking at the catalyst pellets from the bottom of a tube using a fish tape, an air lance is inserted from the top of the tube, and pressurized air is used to dislodge and fluidize the catalyst pellets, which are then evacuated from the top of the tube using a vacuum arrangement.

A prior art air lance for unloading catalyst from a reactor typically includes at least two components—(1) a nozzle to direct pressurized fluid (referred to hereinafter as air, though other fluids may be used) at the catalyst in the reactor and (2) a length of hose to convey pressurized air from a compressed air source to the nozzle. The principle is to blow the pressurized air out the nozzle to fluff up and fluidize the catalyst so it may be sucked up into the vacuum arrangement.

The problem is that pressurized air alone may not be sufficient to dislodge the catalyst pellets from the tube.

SUMMARY

An embodiment of the present invention provides a conduit for delivering a pressurized fluid (such as compressed air) for use in unloading the pellets from the tubes and a rigid member extending down to a claw so that an operator can deliver one or more hammer blows to the rigid member where it extends outside the tube, transmitting the force down to the claw, to break up the pellets, or to break up bridges formed by the pellets, in order to assist in removing the pellets from the tubes. The rigid member may be the conduit itself or a rod extending adjacent to the conduit. Also, the conduit has a plurality of upwardly-directed openings at spaced intervals along its length, which assist in lifting the dislodged pellets up and out the top of the tube.

DESCRIPTION

Figure 1:
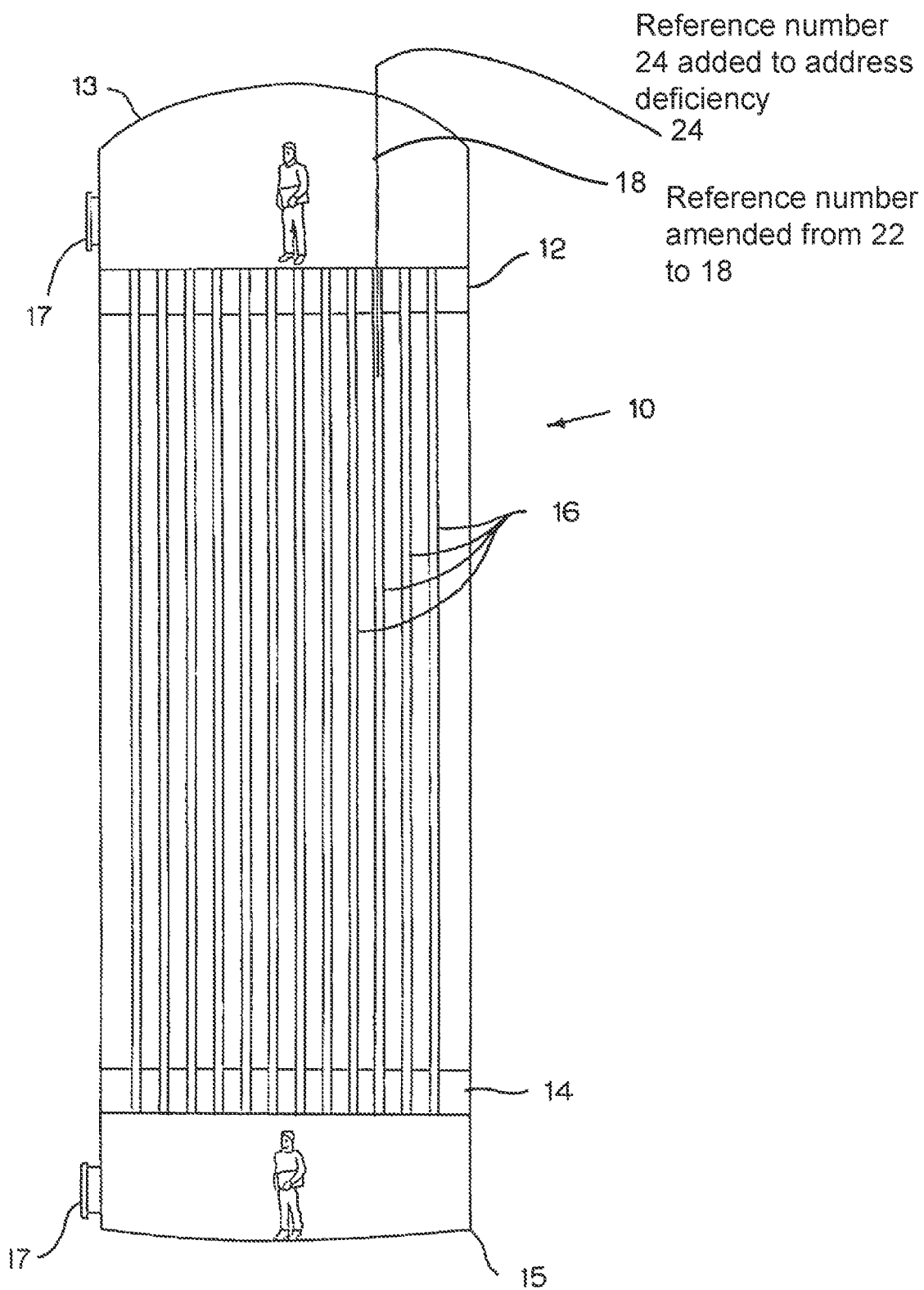
FIG. 1 is a schematic, section view of a shell and tube type of chemical reactor vessel.
Figure 2:
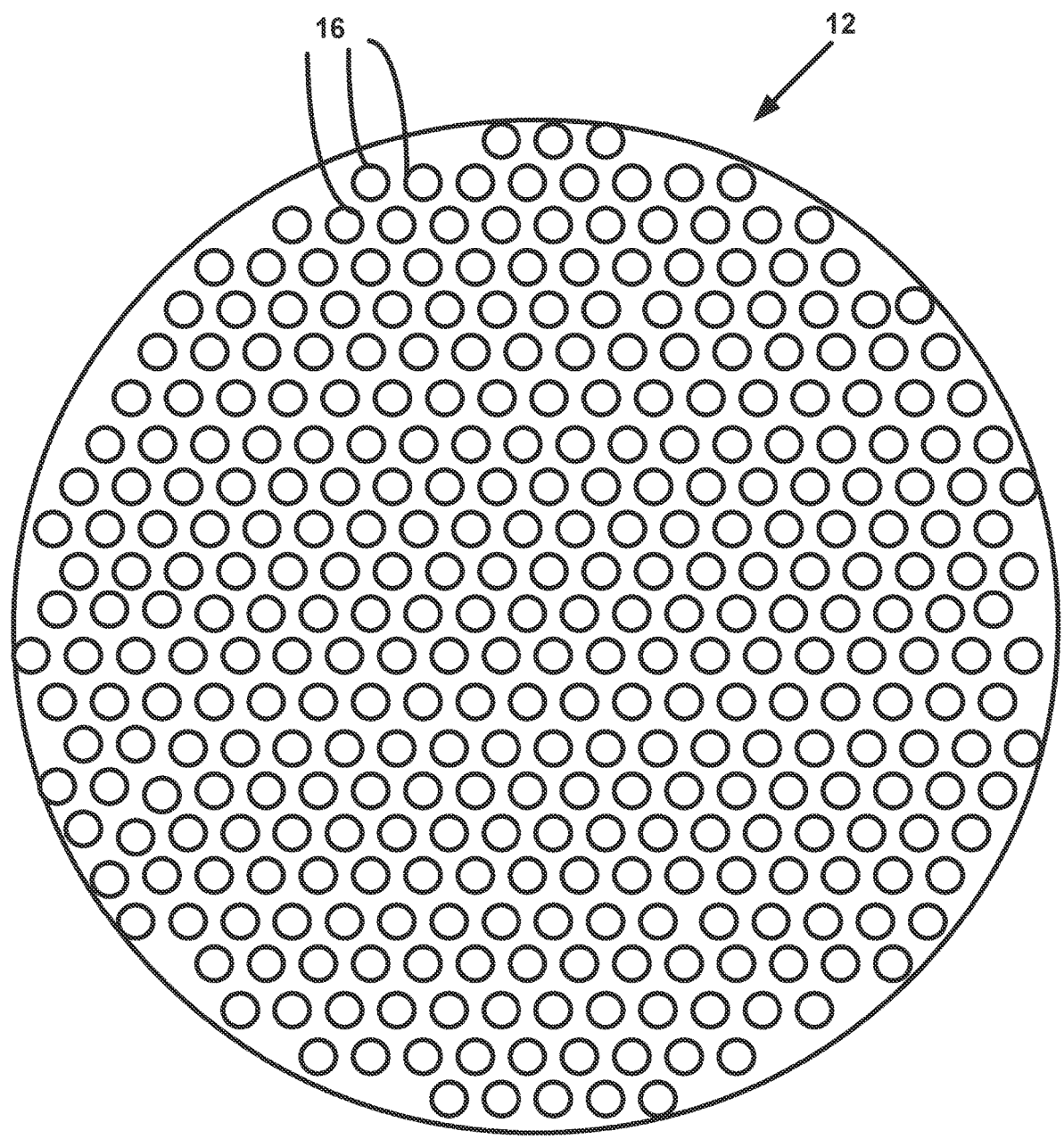
FIG. 2 is a plan view of the upper tubesheet of the reactor vessel of FIG. 1.

FIG. 1 depicts a typical chemical reactor vessel 10, which is a shell and tube heat exchanger, having an upper tubesheet 12 and a lower tubesheet 14 with a plurality of vertical tubes 16 welded or expanded to the tubesheets 12, 14 to form a tightly packed tube bundle. There may be from one to many hundreds or even thousands of cylindrical tubes 16 (See also FIG. 2) extending between the tubesheets 12, 14. Each tube 16 has a top end secured to the upper tubesheet 12 and a bottom end secured to the lower tubesheet 14, and the tubes 16 are open at both ends, except that there may be a spring, clip or grid 32 (See FIG. 4) at the bottom end to retain catalyst pellets inside the tube. The upper and lower tubesheets 12, 14 have openings that are the size of the outside diameter of the tubes 16, with each tube 16 being located in respective openings in the upper and lower tubesheets 12, 14.

The vessel 10 includes a top dome (or top head) 13 and a bottom dome (or bottom head) 15, as well as manways 17 for access to the tubesheets 12, 14 inside the vessel 10. The manways 17 are closed during operation of the reactor but are opened for access, such as during catalyst handling. In this instance, the tubes 16 are filled with catalyst pellets, which facilitate the chemical reaction. Other, non-catalyst pellets, such as filler pellets, also may be inside the tube, and they are referred to herein as catalyst pellets as well.

Reactors have either fixed or removable heads. In this embodiment, the heads are fixed, and they include manways 17 at the top and at the bottom.

This particular reactor vessel 10 is fairly typical. Its tubes can range in length from 5 feet to 65 feet, and it is surrounded by a structural steel skid or framework (not shown), which includes stairways or elevators for access to the tubesheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

A catalyst change operation involves a complete shutdown of the reactor, which may result in considerable cost due to lost production. It is desirable to minimize the amount of time required for the catalyst change operation in order to minimize the lost production and accompanying cost caused by the reactor shutdown as well as for other reasons. The unloading of the catalyst pellets from the reactor tubes is a major time-consuming process.

Figure 3:
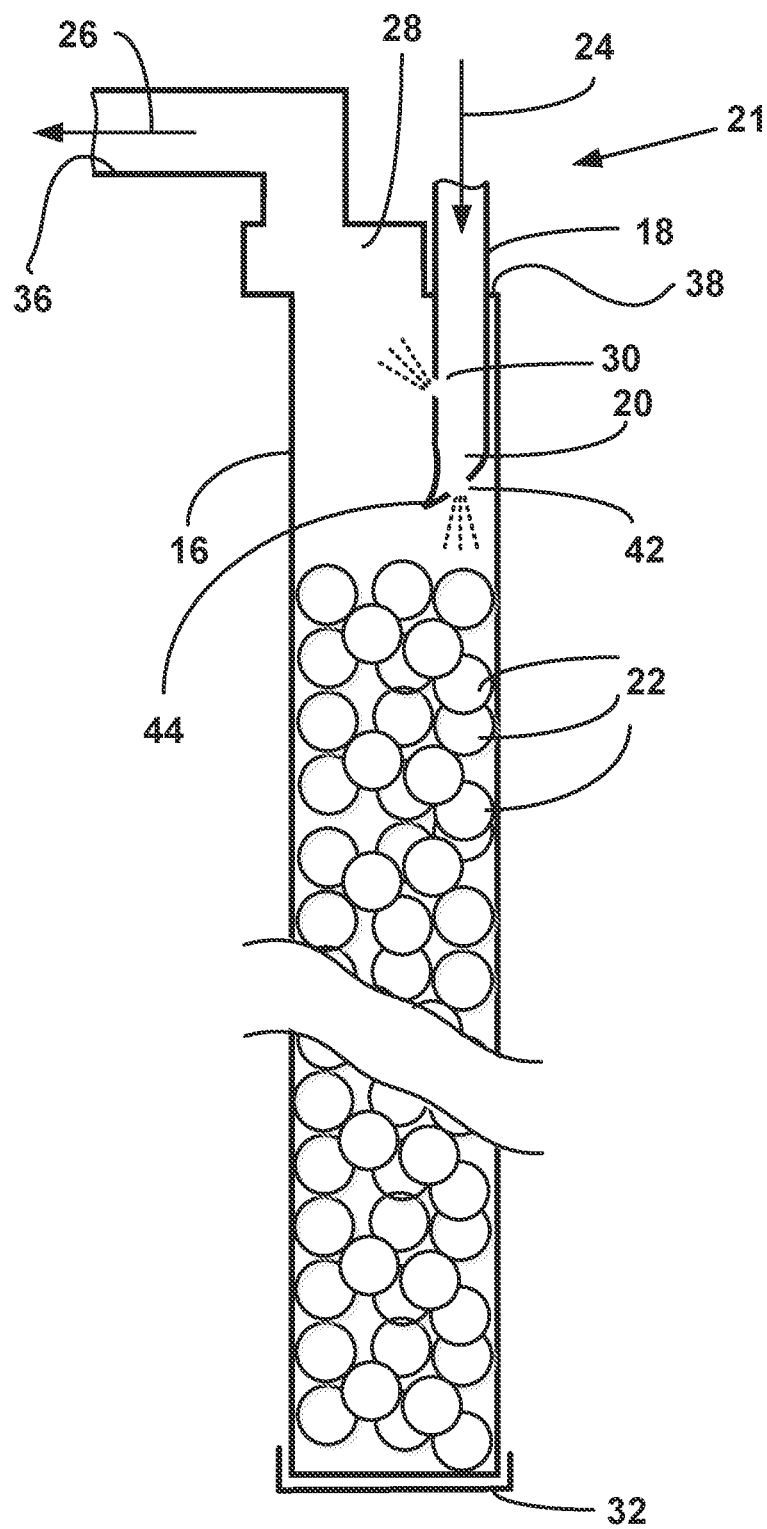
FIG. 3 is a broken away side sectional view of an air lance conduit arrangement for unloading catalyst pellets from a reactor tube, inserted at the top of the tube and showing the compressed air inlet and the vacuum line out.
Figure 4:
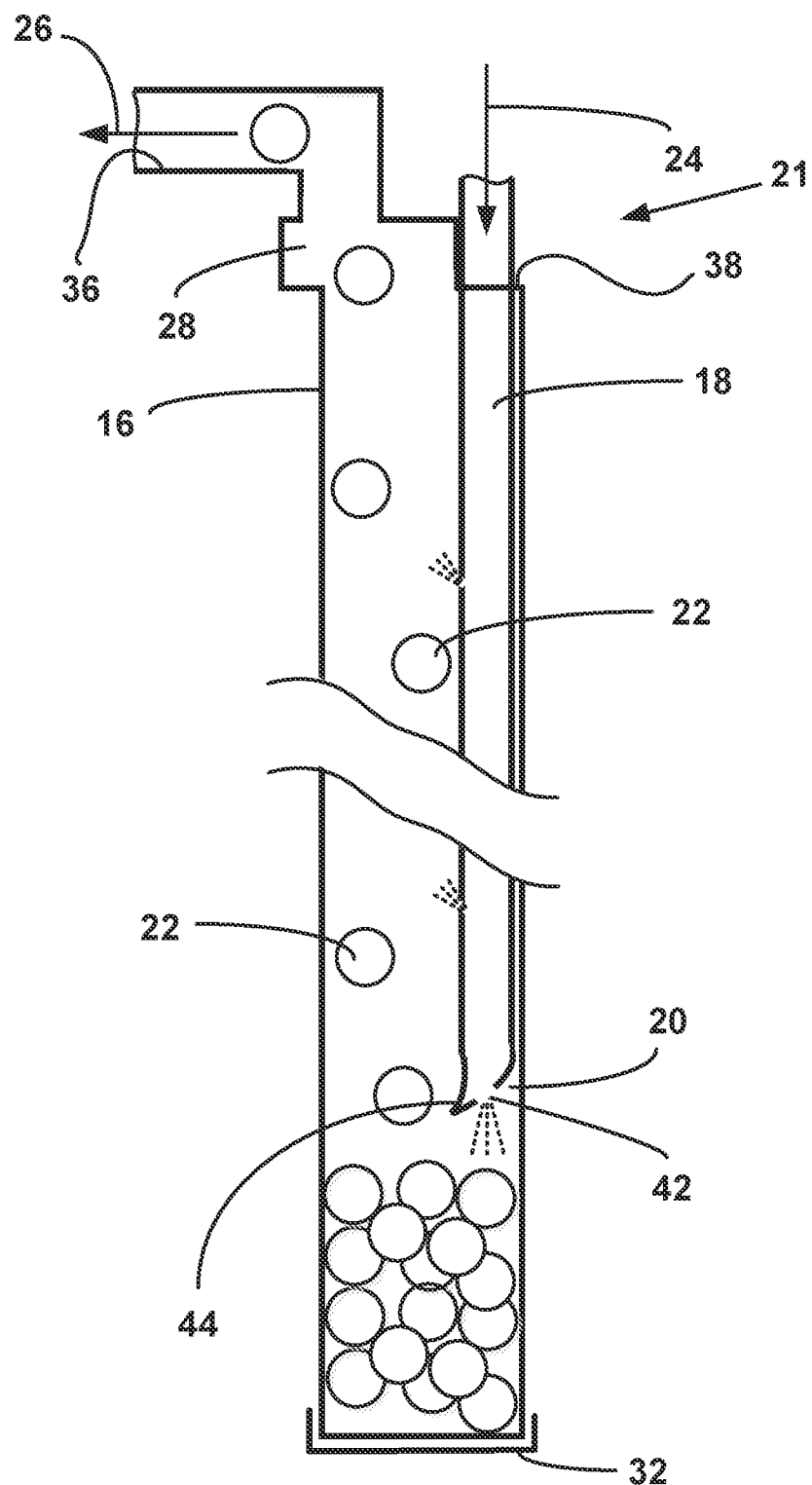
FIG. 4 is a partially broken-away side sectional view of a catalyst-filled reactor tube with the air lance conduit arrangement of FIG. 3 inserted well into the tube and showing the catalyst pellets being fluidized and vacuumed out of the tube.
Figure 5:
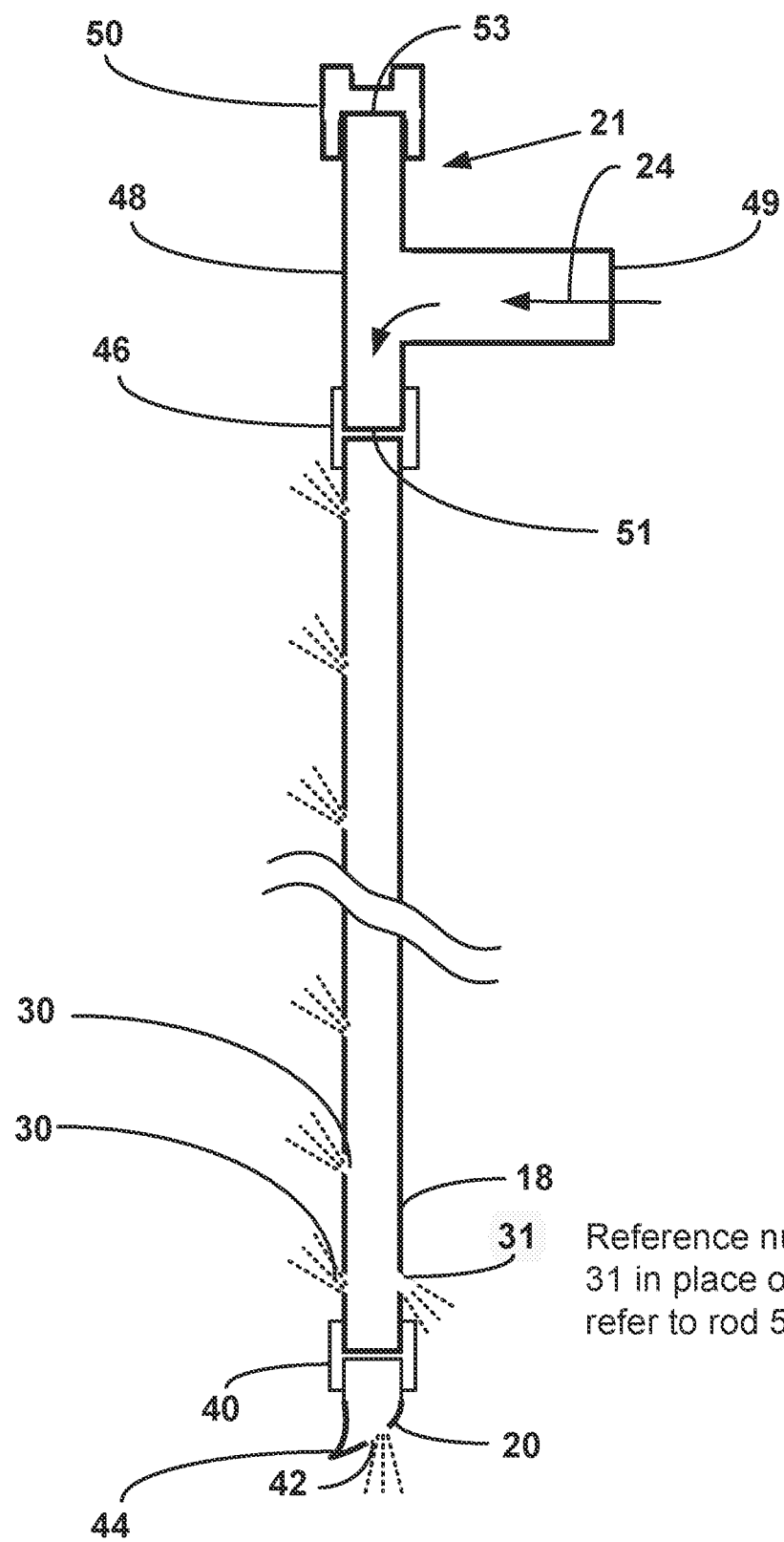
FIG. 5 is a side section view of the conduit of FIGS. 3 and 4, showing an adapter arrangement at the top of the conduit which allows the user to hit the adapter and transfer force to the bottom in order to break up bridging or catalyst pellets at the other end of the conduit.

FIGS. 3-5 show a conduit 18 and nozzle 20 arrangement 21 used for unloading catalyst pellets 22 from a reactor tube 16. This catalyst unloading arrangement includes a compressed air source 24 to inject compressed air via the conduit 18 to and through the nozzle 20. A vacuum source 26 is secured to the top of the reactor tube 16, via a manifold 28, to evacuate any catalyst pellets 22 which have been dislodged and fluidized by the pressurized air expelled by the nozzle 20.

The manifold 28 defines a first opening 36 which provides a fluid connection between the interior of the tube 16 and the vacuum source 26 to enable the extraction of the pellets 22 once they have been dislodged and fluidized. Compressed air 24 enters the inlet end of the conduit 18, flows through a main internal passageway in the conduit body 18 and exits at outlets 30 at spaced-apart intervals along the conduit 18 and at a bottommost opening 42 in the nozzle 20, as shown in FIGS. 3-5. The manifold 28 also defines a second opening 38, which is an entry point for the conduit 18 into the top of the tube 16.

In FIG. 5, the nozzle 20 is threaded onto the conduit 18 via a threaded collar 40 to allow the nozzle 20 to be replaced as necessary. The nozzle 20 has a bottommost opening 42 to allow a pressurized fluid (such as compressed air) which has passed through the conduit to exit and help dislodge and fluidize the pellets 22. The nozzle 20 also defines a claw 44, which extends beyond the bottommost opening 42. The claw 44 serves as a spacer, to keep the bottommost opening 42 slightly above the level of pellets in the tube 16, and it can be used as a poker, to poke at, and to strike pellets in order to dislodge the pellets so they can be fluidized.

In this embodiment, the conduit 18 is rigid so that hammering forces applied at the top of the conduit 18, outside the tube 16, are transferred down to the claw 44, allowing the claw 44 to hammer at the pellets inside the tube to dislodge or break apart the pellets. A flexible hose may be used to transfer compressed fluid from a compressed fluid source (such as an air compressor) to the top of the rigid conduit 18.

Figure 6:
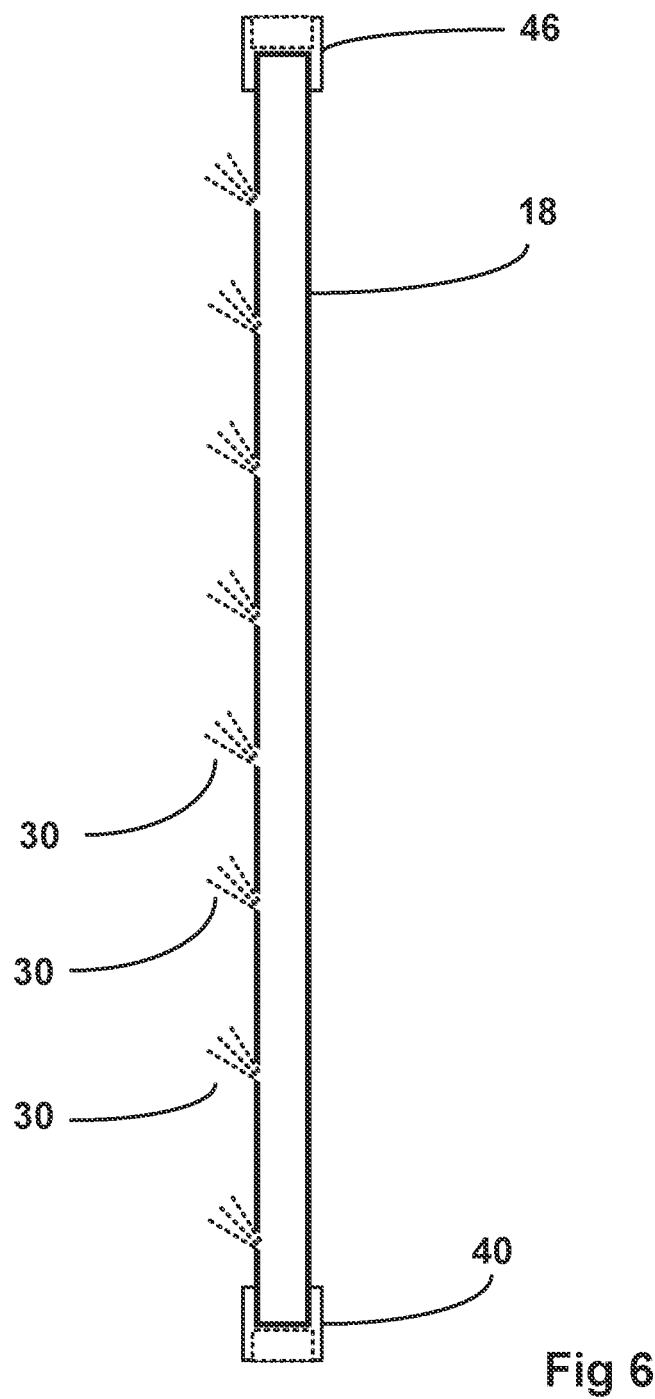
FIG. 6 is a side section view of a section of conduit which may be added to the top of the conduit of FIGS. 3-5 to lengthen the conduit so as to reach deeper into the tube.
Figure 7:
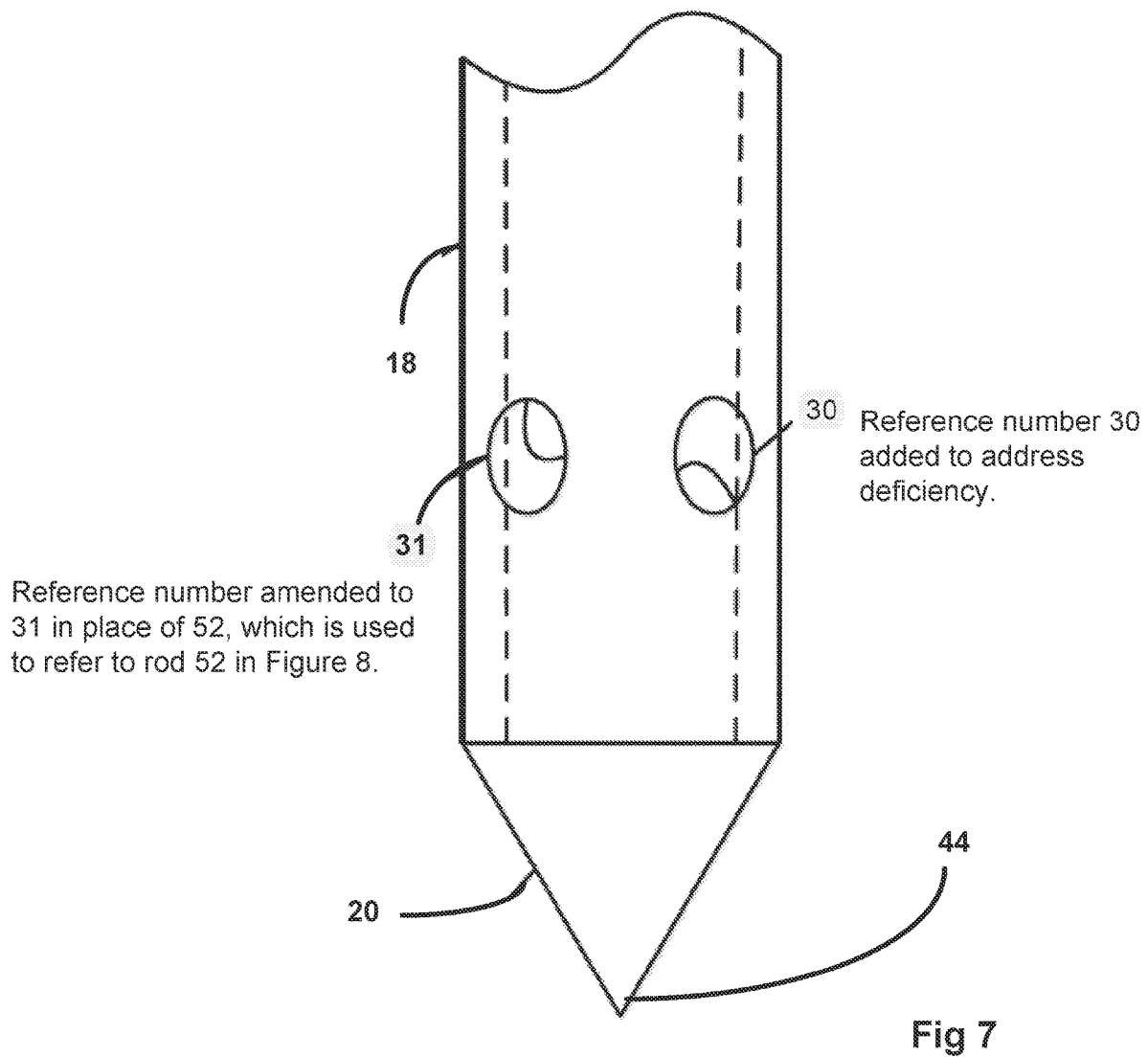
FIG. 7 is a side section view of an air lance nozzle which may be used at the end of the conduit of FIGS. 3-5, showing a detail of upwardly and downwardly oriented openings for venting compressed air.

The inlet end of the conduit 18 includes another threaded collar 46. A plurality of additional lengths of conduit 18 as shown in FIG. 6, may be strung together by a plurality of threaded collars 46, as needed, to reach deep into the tube 16. A rigid adapter tube 48 at the inlet end of the conduit 18 (See FIG. 5) includes an inlet 49; an outlet 51 rigidly connected to the conduit body 18 at the inlet opening of the conduit body 18, such that the inlet 49 of the adapter tube 48 is in fluid communication with the main internal passageway of the conduit 18; and an upward projection 53. A compressed fluid 24 is admitted through the inlet 49, through the adapter tube 48, and into the conduit 18 to aid in fluidizing and expelling the pellets 22, or broken pellet particles, from the interior of the tube 16. The adapter tube 48 is at least as rigid as the conduit 18. The upwardly-directed portion 53 can be struck by the user to transmit a force down, through the adapter 48, and through the rigid conduit 18 to the claw 44 in order to impact against the pellets to break them apart or to pulverize the pellets, if necessary. An adapter cap 50 may be fitted atop the upwardly-directed portion 53 to spread the forces of impact over the entire top of the upwardly-directed portion 53 to protect the adapter 48 as it is being struck repeatedly by a hammer. The hammer (not shown in this view) may be a hand-held hammer, a pneumatic air hammer, or some other hammer which is adapted to deliver repeated impacting forces against the upwardly-directed portion 53. The impact of the hammer is transmitted through the rigid adapter 48, and through the rigid conduit 18 to the claw 44 and then to the pellets which are then broken up or pulverized and then fluidized by the air jets and extracted by the vacuum 26 at the first opening 36 of the manifold 28. The conduit 18 in this embodiment is rigid enough that most of the force of the hammer at the top of the conduit is transmitted through the conduit 18 to the claw 44 to break up the pellets. (If the conduit 18 were a flexible hose, it would not have sufficient rigidity to perform this function.)

It should be noted that most of the air jet openings 30 are oriented upwardly to aid in lifting any pellets or broken pellet particles out of the tube 16. However, as shown in FIG. 5, at least one downwardly-directed opening 31 is located at or near the bottom of the conduit 18 to allow an air jet to blow downwardly to help dislodge pellets. As shown in FIG. 1, the conduit 18 is connected to the source of compressed or pressurized fluid 24, which may external to the reactor tube. Additionally, a downwardly-directed opening 42 is located on the nozzle 20, providing a downwardly-directed air jet to aid in fluidizing the pellets 22 or pellet particles. In this embodiment, the claw 44 is part of the nozzle 20. However, the claw 44 could be separate from the nozzle 20 if desired.

To use the pellet unloading arrangement 21, as shown in FIG. 3, the operator installs the manifold 28 on the tube 16 to be cleaned out and connects a vacuum source 26 to the opening 36. He then inserts the rigid conduit 18 through the opening 38 in the manifold 28, installs the adapter 48 (shown in FIG. 5) at the top of the conduit 18, and turns on the compressed air 24 as he pushes down on the conduit 18. (A movable collar may be provided to block off the openings 30 that are outside of the tube 16, with the collar being raised to gradually unblock each opening 30 as that opening 30 enters into the tube 16.) When the outlet end of the conduit 18 reaches the level of the top pellets 22, he may poke at them with the claw 44 until he disrupts the top pellets 22, and the pellets 22 become fluidized and start flowing upwardly through the tube 16 and out of the manifold 28. The user continues to push the conduit 18 downwardly, continuing to fluidize the pellets 22 in the path of the downwardly-directed air jet coming out of the opening 42 in the nozzle 20. If the user's headway is slowed down by stuck, fused, or otherwise jammed pellets, he can take a hammer (not shown) and strike the top end of the upwardly-directed portion 53 of the adapter 48 (or the adapter cap 50). The conduit 18 is rigid enough to transmit most of the force of the hammer blows down to the claw 44 and to the pellets 22, either breaking them loose or breaking them apart. This action is continued until all of the pellets 22 have been evacuated from the tube 16. If the top end of the conduit 18 reaches the manifold 28 before the claw 44 reaches the bottommost pellets 22, the operator shuts off the compressed air 24, removes the adapter 48, and adds another length of conduit 18 (as shown in FIG. 6), securing the additional length of conduit to the existing length of conduit 18 via the collar 40. He then reinstalls the adapter 48, restarts the compressed air 24, and proceeds pushing the conduit 18 down into the pellets 22, again using the hammer as needed to dislodge them. This process may be repeated, adding more lengths of conduit 18 as needed until the entire tube 16 is evacuated of pellets 22.

Figure 8:
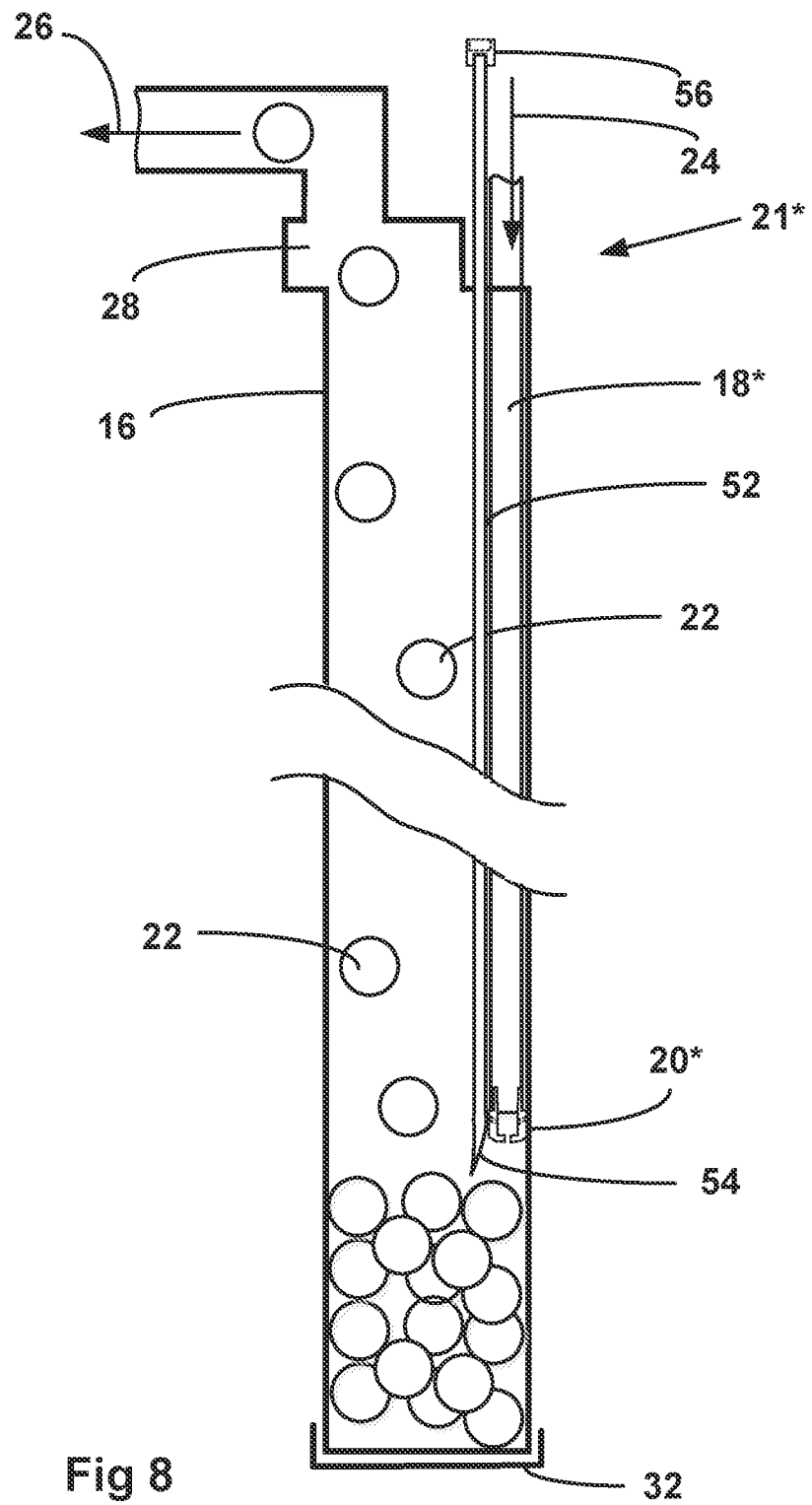
FIG. 8 is a view, similar to that of FIG. 4, but showing an alternate embodiment wherein the conduit for transporting compressed air to fluidize the pellets is separate from the rigid member used to hammer and pulverize pellets which are stuck in the tube.

FIG. 8 shows an alternative arrangement 21* for unloading pellets 22 from a tube 18. In this embodiment, a conduit 18* with a nozzle 20* extends alongside a rigid rod 52, which has a claw 54 at its lower end. The claw 54 preferably is threaded onto the end of the rigid rod 52 for ease of replacement as required. The rigid rod 52 is secured to the conduit 18*. This conduit 18* need not be a rigid conduit; it may be a flexible conduit, such as a hose, as it is not used to transmit the force of hammer strikes to the pellets 22. Likewise, the nozzle 20* may be a conventional nozzle, not including a claw, as it is not used to strike and break apart/pulverize pellets 22.

As in the previous embodiment, the claw 54 extends beyond the bottom end of the conduit 18*, so it serves as a spacer and a poker. The rod 52 also includes threaded collars 56 at both ends (only shown at the top end in FIG. 8) so that a plurality of lengths of rod 52 may be strung together, as needed, to reach deep into the tube 16. A major difference between the rod 52 of this embodiment and the conduit 18 of the previous embodiment is that the rod 52 need not be hollow for transmitting a fluid. Therefore, the rod 52 may be solid. Again, the rod 52 is rigid enough to transmit most of the force of a hammer strike at its upper end to the claw 54 at its lower end and to a pellet being struck by the claw 54. An adapter cap (not shown, but similar to the cap 50 of FIG. 5) may be secured at the upper end of the rod 52 to receive the hammer strike so as not to damage the rod 52 or its threaded collar 56.

Figure 12:
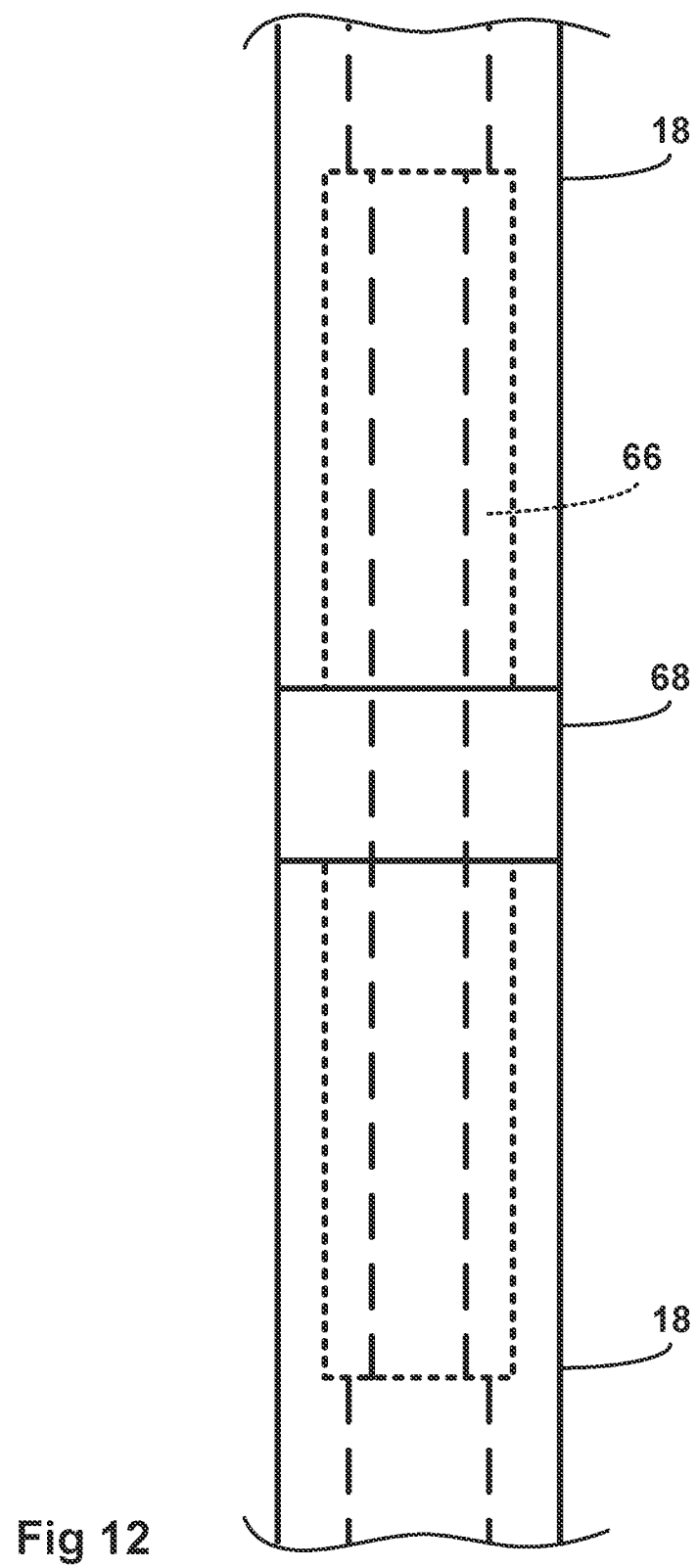
FIG. 12 is a side view of fused or brazed conduits showing an alternate means for connecting conduits instead of using the threaded collars of FIG. 6.
Figure 13:
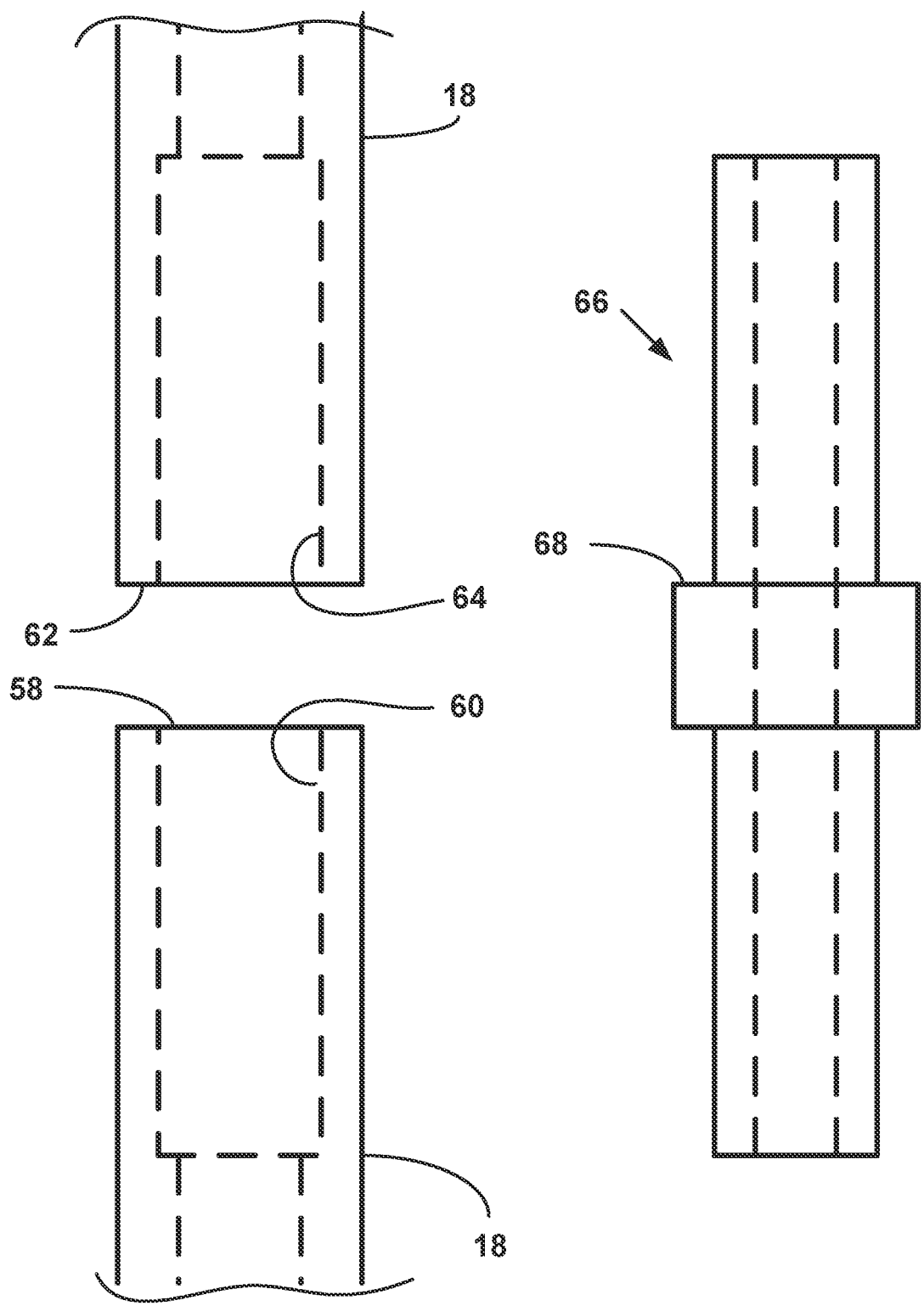
FIG. 13 is an exploded side view of the conduits of FIG. 12.

It should be noted that the lengths of conduit 18 or of rod 52 discussed in the above embodiments may be joined together by means other than by the use of the threaded collars mentioned above. For instance, and as shown in FIGS. 12 and 13, it is possible to join the lengths by induction brazing them together. In this instance, the upper end 58 of a lower conduit 18 defines a recessed, cylindrical opening 60, and the lower end 62 of an upper conduit 18 defines a similar recessed, cylindrical opening 64.

A hollow connecting fitting 66 having an outside diameter that just fits inside the inside diameter of the cylindrical openings 60, 64, includes an enlarged middle spacer portion 68 containing the brazing or filler metal. This connecting fitting 66 is inserted into the corresponding recessed openings 60, 64 of the conduits 18 to be brazed together, as shown in FIG. 12. The connecting fitting 66 is then heated, typically by inducing an electrical current through the fitting 66 and, in this instance, through the ends 58, 62 of the conduits 18, until the brazing or filler metal melts and flows, through capillary action, between the close fitting connecting fitting 66 and the recessed openings 60, 64 to form a strong, leak-proof joint.

When removing the conduit 18, these brazed-together conduits 18 may be pulled apart by reheating the brazed area, or by using a tubing cutter, which would also allow them to be separated for disassembly. Other methods to connect conduits may include, but are not limited to, welding them together, clamping them together, or even soldering them together, for instance.

To use this pellet unloading arrangement 21*, the operator follows essentially the same procedure as for the arrangement 21 discussed above. However, since the conduit 18* is not being used to strike at the pellets 22, the user can leave the compressed air 24 on all the time, and there is no adapter to remove in order to install a new length of rod 52. When the top end of the rod 52 reaches the manifold 28, the operator simply adds another length of rod 52 via the threaded collar 56 and continues lowering the arrangement 21* and hammering on the top of the rod 52 until all the pellets 22 are removed.

Figure 9:
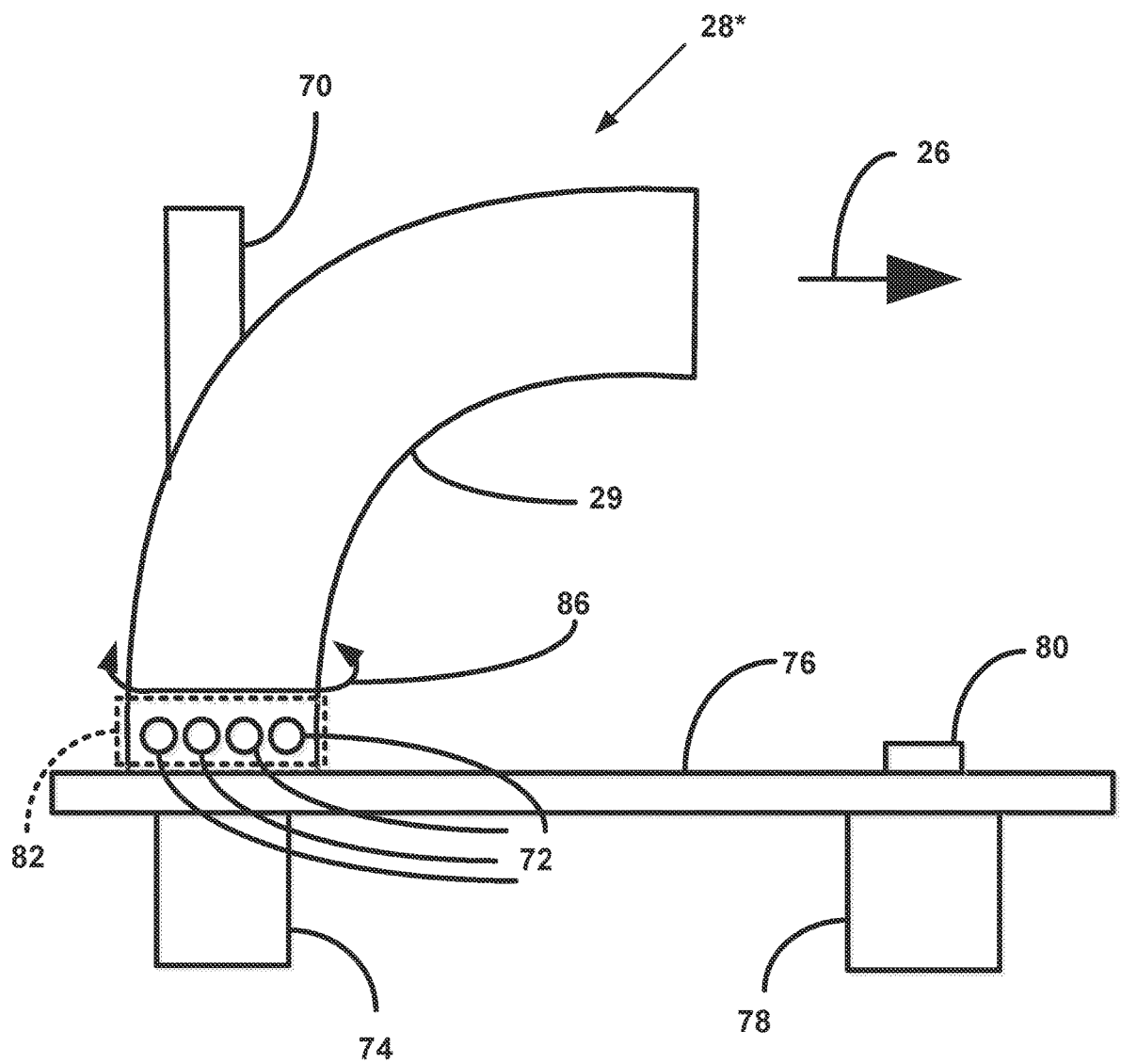
FIG. 9 is a side view of an embodiment of an alternative elbow which may be used with the air lance conduit arrangements shown in the previous figures.

FIG. 9 shows an embodiment of an alternative vacuum manifold 28* which may be used instead of the manifold 28 of FIGS. 3 and 8. In this vacuum manifold 28*, the tube 29 that connects between the reactor tube 16 and the vacuum 26 resembles a sweep elbow, providing a smooth 90 degree turn to reduce pressure drop and to minimize the possibility of pellets 22 (See FIG. 8) getting stuck or bridging in the manifold 28* as the pellets 22 are being removed from the tube 16 by the vacuum 26. This manifold 28* also includes a vertical riser 70 for the introduction of the conduit 18 into the reactor tube 16. The conduit 18 is inserted into the vertical riser 70 with a close fit, passes through the elbow 29, and extends into the reactor tube 16. The elbow 29 of the manifold 28* defines a plurality of through openings 72 adjacent its bottom end, which allows ambient air to enter the elbow 29 to provide a boost of air flow to enhance the evacuation of the pellets to the vacuum source as the pellets enter the elbow 29.

The manifold 28* includes a short, cylindrical, downwardly-directed, tubular projection 74, which is inserted into the reactor tube 16 and helps to properly locate the manifold 28* on the reactor tube 16 being worked on. A plate 76 connects the manifold 28* to a compressible pin 78, which may be secured to an adjacent reactor tube via the bolt 80, which compresses the length of the pin 78 and expands the diameter of the pin 78 to wedge the pin 78 in the adjacent tube 16. This plate 76 and pin 78 assembly allows the manifold 28* to be secured to the tubesheet without the need for the user to hold it in place. The user also may step atop the plate 76, providing additional anchoring of the manifold 28* onto the tubesheet.

Figure 11:
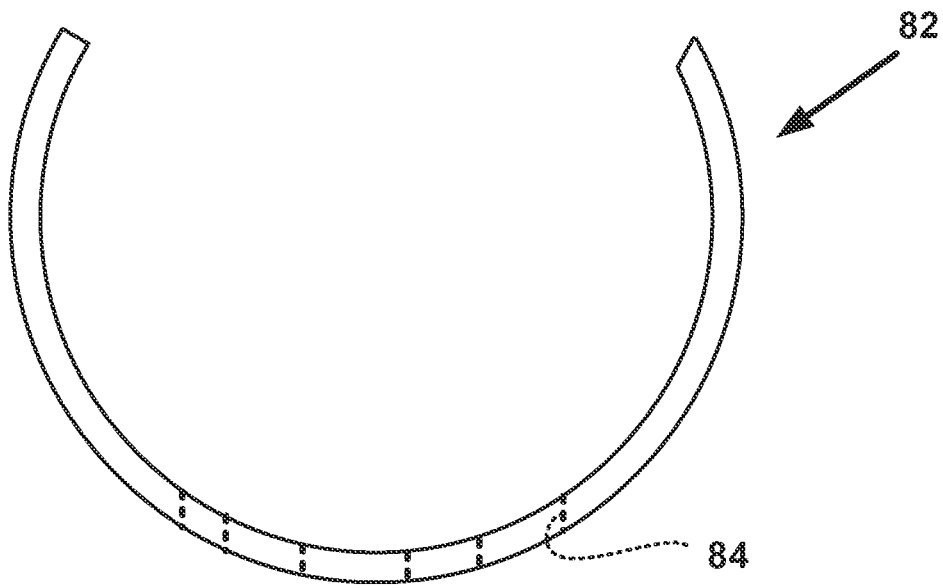
FIG. 11 is a plan view of the collar of FIG. 10.
Figure 10:
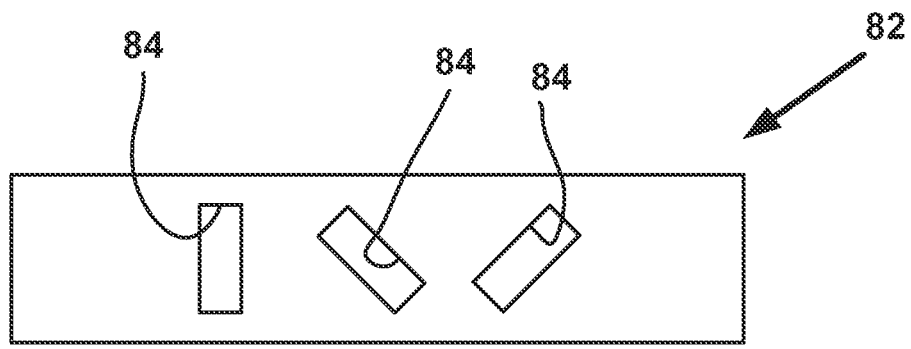
FIG. 10 is a side view of a collar which may be used to close off or regulate the size of the openings in the elbow of FIG. 9.

FIGS. 10 and 11 show an arcuate clip or collar 82 which is slightly more than a semicircle. The collar 82 defines a plurality of slotted openings 84. When the collar 82 is installed on the elbow 29, as shown in phantom in FIG. 9, the collar 82 may be rotated around the base of the elbow 29 in the direction of the arrows 86 to bring one or more of the openings 84 into alignment, into partial alignment, or into misalignment with the openings 72 at the base of the elbow 29. This mechanism allows the user to adjust the size of the open path through the openings 72, and thereby adjust the amount of ambient air that will be admitted into the elbow 29 to provide enough air flow boost to enhance the evacuation of the pellets to the vacuum source 26 without overwhelming the vacuum source 26.

Figure 14:
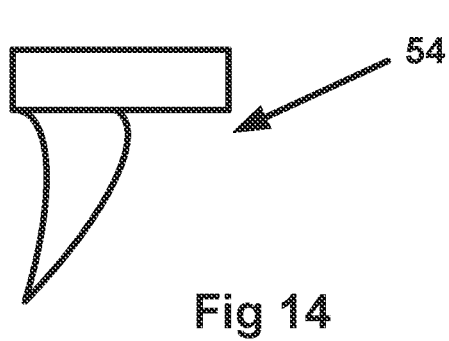
FIG. 14 is a side view of a claw, similar to that shown in FIG. 5, for dislodging pellets in a tube.
Figure 15:
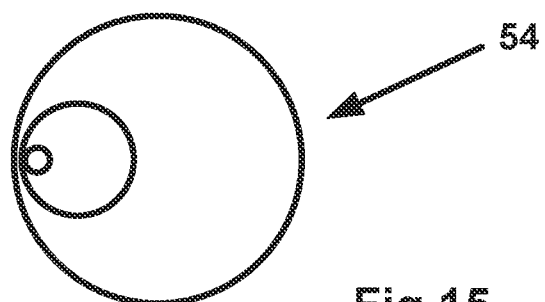
FIG. 15 is a bottom end view looking up, of the claw of FIG. 14.
Figure 16:
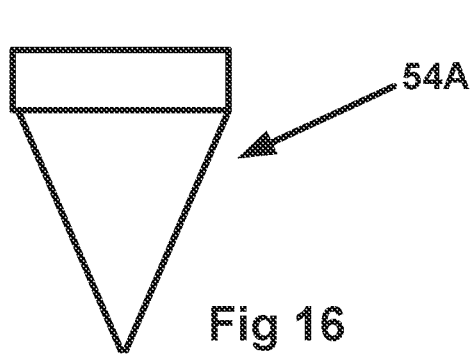
FIG. 16 is a side view of an alternative poker, similar to that shown in FIG. 7, which may be used instead of the claw of FIG. 14 for dislodging pellets in a tube.
Figure 17:
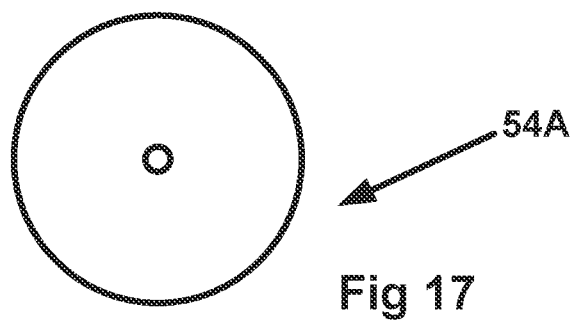
FIG. 17 is a bottom end view looking up, of the poker of FIG. 16.

The claw 54 disclosed above and shown in FIGS. 5 and 8 is shown again in FIGS. 14 and 15. Depending on the application and the nature of catalyst pellets being unloaded and its predisposition to bridging, jamming, and fusing, it may be desirable to use an alternate poker instead of, or in addition to, the claw 54. FIGS. 16 and 17 show an alternate embodiment of a poker 54A. This poker 54A is most useful when sharp, forceful, pointed strikes at the jammed or fused pellets results in good break-up of the jam.

Figure 18:
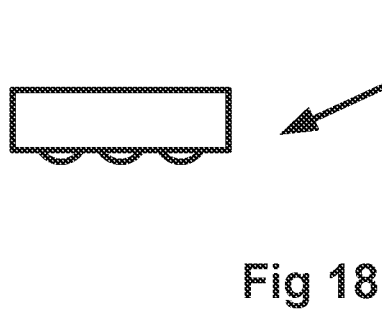
FIG. 18 is a side view of a three-toothed poker, which may be used instead of the claw of FIG. 14 for dislodging pellets in a tube.
Figure 19:
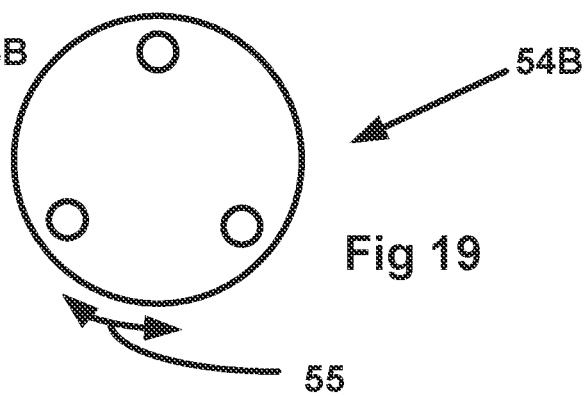
FIG. 19 is a bottom end view looking up, of the three-toothed poker of FIG. 18.

FIGS. 18 and 19 show an alternate embodiment of a poker which, in this instance, is a three-toothed grinding arrangement 54B. This grinding arrangement 54B is most useful when repeated downward strikes only pack the pellets more firmly and when abrading the pellets with a rotating/grinding circular motion, in the direction of the arrows 55, yields better results in breaking up the jam.

Figure 20:
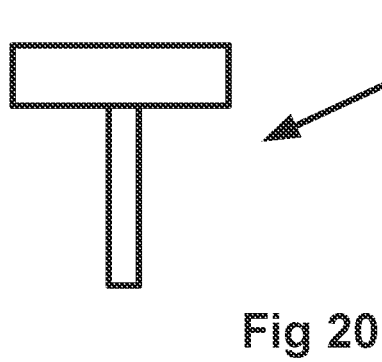
FIG. 20 is a side view of an alternative poker, which may be used instead of the poker/claw of FIG. 14 for dislodging pellets in a tube.
Figure 21:
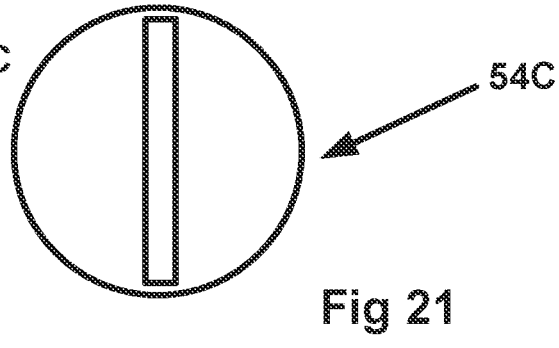
FIG. 21 is a bottom end view looking up, of the poker of FIG. 20.

FIGS. 20 and 21 show an alternate embodiment of a poker which, in this instance, is a cleaver 54C. This cleaver 54C may be used to combine the downward striking capability of the poker 54A with the ability to abrade and grind the pellets of the grinding arrangement 54B in a unit that is a compromise of the two 54A and 54B. The cleaver 54C may be driven downwardly forcefully and then, when wedged in the pellet jam, a rotating/grinding motion is applied to break up the jam.

Figure 22:
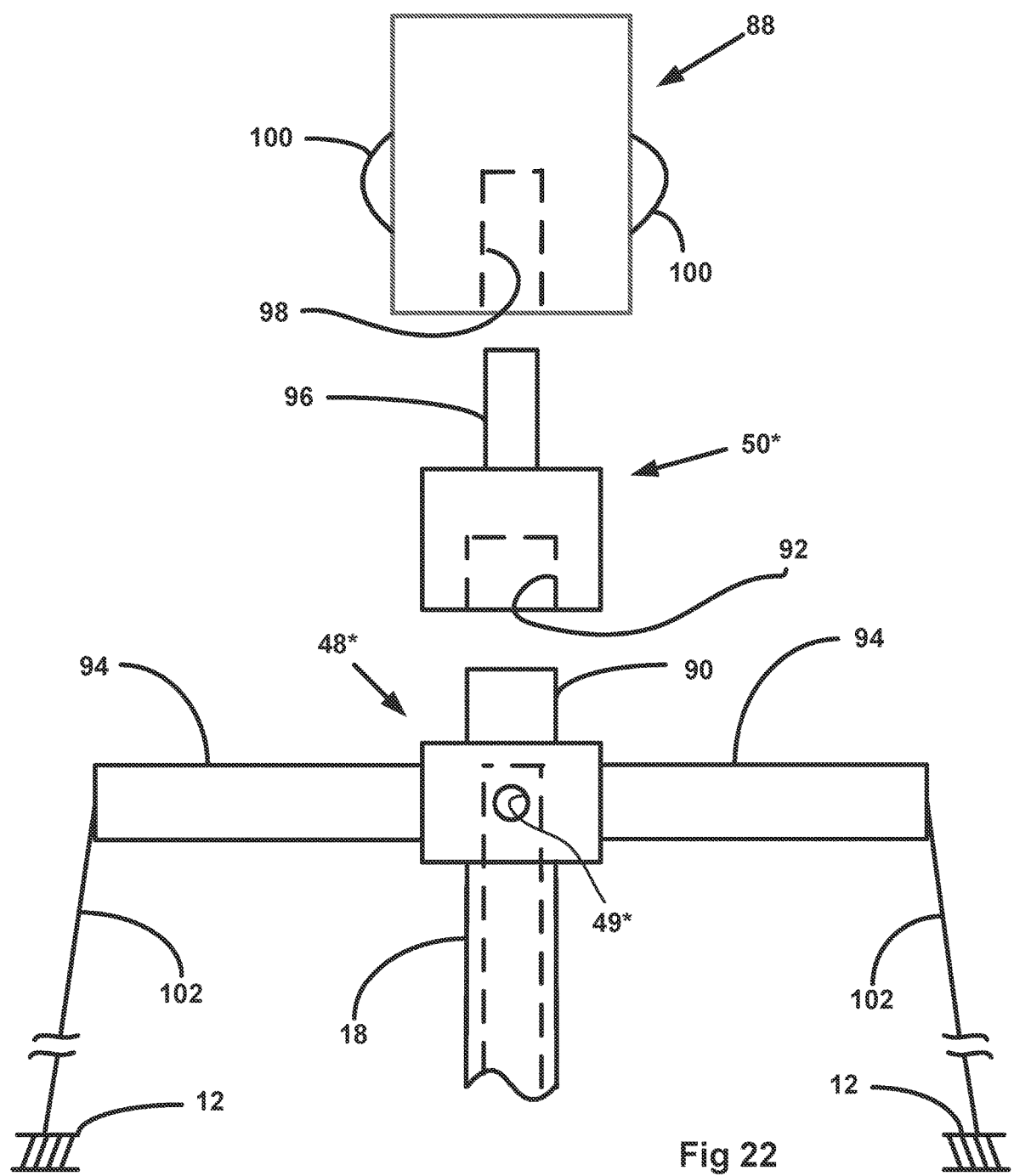
FIG. 22 is a partially broken-away, partially in section, side view of an adapter tee, adapter cap, and pneumatic hammer which can be used with the conduit and nozzle arrangements described in this application.

FIG. 22 shows an alternate arrangement for an adapter tee 48* and adapter cap 50* to be used with a pneumatic hammer 88 to drive and jostle the pokers 54, 54A, 54B, 54C described above. The adapter tee 48* is similar to the adapter tee 48 of FIG. 5 in that it defines an opening 49* for pressurized air to be injected into the conduit 18, and it has an upward projection 90 (in this instance it is an externally threaded projection 90) to be received in the internally threaded cavity 92 of the adapter cap 50*.

The adapter tee 48* further includes outwardly-extending handlebars 94 which the operator can grab and use to rotate the adapter tee 48*, and therefore also rotate the conduit 18 about its longitudinal axis. Since the claw 54 (or alternatively any of the alternative pokers disclosed 54A, 54B, 54C) is secured to the conduit 18, the operator can use the handlebars 94 to provide an abrading/grinding, circular back and forth, oscillating motion to the claw 54, in the direction of the arrows 55 of FIG. 19, in order to work on and break up a jam of the pellets inside the reactor tube. The handlebars 94 allow the operator to reposition the tip or bottom end of the conduit 18 relative to the pellets to help break up and unload the pellets from the reactor tube. It should be noted that the poker may be at the end of a rigid rod 52 (See FIG. 8) instead of at the end of a conduit 18, in which case there may be a different inlet to admit pressurized air into the adjacent conduit 18.

The adapter cap 50* is similar to the adapter cap 50 of FIG. 5 in that it is used to transfer the impacts from a hammer, in this case a pneumatic hammer 88, to the adapter tee 48* and on to the conduit 18, the claw 54, and the jammed pellets. The adapter cap 50* is threaded onto the threaded projection 90 of the adapter tee 48* so that the two parts 48*, 50* act in unison. The adapter cap 50* defines a smooth-surfaced pin 96 sized to be received in the smooth bore cavity 98 of the impact hammer 88. The adapter cap 50* allows the impact hammer 88 to remain in proper horizontal and vertical alignment with the adapter tee 48* so that the impact hammer 88 may be used with ease and efficiency.

The impact hammer 88, which is typically a pneumatic hammer but which may instead be an electric hammer or hydraulic hammer, includes shock cords 100 which are attached to the handlebars 94 of the adapter tee 48*. These shock cords 100 act like a return spring to connect the impact hammer 88 to the adapter tee 48* so that, as the impact hammer 88 strikes the conduit 18 (or the rod 52 of FIG. 8), it bounces up and the shock cords 100 draw the impact hammer 88 back into contact with the adapter tee 48*. The floating adapter arrangement (comprising the pin 96 of the adapter cap 50* slidingly connected to the smooth bore cavity 98 of the impact hammer 88) allows sufficient vertical movement so that the impact hammer 88 can bounce off a substantial distance and still remain properly aligned to receive the next hammer blows imparted by the impact hammer 88.

In this embodiment, the handlebars 94 are also secured via shock cords 102 to the top tubesheet 12 so as to keep the pneumatic driving arrangement (including the adapter tee 48*, the adapter cap 50*, and the impact hammer 88) in substantial vertical alignment during the operation of the device without requiring constant handholding by the operator. This helps pull the device downwards and into the reactor tube to speed up the pellet unloading process, further automates the operation, and relieves the tedium and repetitive impact motion and vibration fatigue of the device on the operator.

It will be obvious to those skilled in the art that modifications may be made to the embodiments described above without departing from the scope of the invention as claimed.

What is claimed is:

1. An air lance for removing pellets from reactor tubes, comprising:
   a conduit body having an inlet end defining an inlet opening, an outlet end defining a bottommost discharge opening, an outer surface, a main internal passageway from said inlet opening to said bottommost discharge opening;
   a poker fixed relative to said conduit body and projecting beyond said bottommost discharge opening to serve as both a spacer and poker; and
   a rigid adapter comprising an adapter inlet, an adapter outlet, and an upward projection, the adapter outlet being connected to said inlet opening of said conduit body, such that said adapter inlet is in fluid communication with said main internal passageway of said conduit body;

wherein a rigid member extends along said conduit body for an extended distance to said poker, such that said outlet end of said conduit body, said poker, and said rigid member may be inserted into a reactor tube, with the top of said rigid member and said inlet opening located above the reactor tube, and wherein a hammering force applied to said upward projection will be transmitted through said rigid adapter and through said rigid member to said poker may be applied to the top of said rigid member to be transmitted through said rigid member to said poker for dislodging and breaking pellets.

2. An air lance for removing pellets from reactor tubes as recited in claim 1, wherein said rigid member is said conduit body itself, said conduit body being made of a rigid material.

3. An air lance for removing pellets from reactor tubes as recited in claim 1, wherein said rigid member is a rod lying adjacent to and secured to said conduit body.

4. An air lance for removing pellets from reactor tubes as recited in claim 1, wherein said conduit body defines a plurality of upwardly-directed openings at spaced intervals along its length, for assisting in lifting dislodged pellets up and out of the top of the reactor tube.

5. An air lance for removing pellets from reactor tubes as recited in claim 1, further comprising:
a vacuum manifold configured to be mounted on top of a reactor tube, said vacuum manifold including an arcuate elbow wall defining a plurality of openings through said arcuate elbow wall for allowing ambient air to pass through said openings when said arcuate elbow is connected to a vacuum line; said vacuum manifold also including a vertical riser configured to receive said conduit body with a close fit such that said conduit can pass through said vertical riser and through said arcuate elbow wall into the reactor tube when the manifold is mounted on the reactor tube.

6. An air lance for removing pellets from reactor tubes as recited in claim 1, wherein said rigid member comprises a plurality of rigid sub-members adapted to be brazed together at respective mating ends of said plurality of rigid sub-members.

7. An air lance for removing pellets from reactor tubes as recited in claim 6, further comprising a plurality of complementary fittings configured to matingly join said plurality of rigid sub-members adapted by brazing.

8. An air lance for removing pellets from reactor tubes as recited in claim 7, further comprising a plurality of hollow fittings each adapted to be received into and join respective ends of said plurality of rigid sub-members.

9. An air lance for removing pellets from reactor tubes comprising:
a conduit body having an inlet end defining an inlet opening, an outlet end defining a bottommost discharge opening, an outer surface, a main internal passageway from said inlet opening to said bottommost discharge opening; and
a poker fixed relative to said conduit body and projecting beyond said bottommost discharge opening to serve as both a spacer and poker;
a rigid adapter tube, including an inlet; an outlet connected to said conduit body at said inlet opening, such that said inlet is in fluid communication with said main internal passageway;

and an upward projection, such that that a hammering force applied to said upward projection will be transmitted through said rigid adapter tube and through said rigid conduit body to said poker;

wherein a rigid member extends along said conduit body for an extended distance to said poker, such that said outlet end of said conduit body, said poker, and said rigid member may be inserted into a reactor tube, with the top of said rigid member and said inlet opening located above the reactor tube, and wherein a hammering force may be applied to the top of said rigid member to be transmitted through said rigid member to said poker for dislodging and breaking pellets.

10. An air lance for removing pellets from reactor tubes as recited in claim 9, wherein said conduit body defines a plurality of upwardly-directed openings at spaced intervals along its length, which assist in lifting the dislodged pellets up and out of the top of the reactor tube.

11. An air lance for removing pellets from reactor tubes as recited in claim 9, wherein said rigid adapter tube also includes outwardly-extending handles to permit a user to rotate said conduit body.

12. An air lance for removing pellets from reactor tubes as recited in claim 9, wherein said rigid member is said conduit body itself, said conduit body being made of a rigid material.

13. An air lance for removing pellets from reactor tubes as recited in claim 9, wherein said rigid member is a rod lying adjacent to and secured to said conduit body.

14. An air lance for removing pellets from reactor tubes as recited in claim 9, further comprising:
a vacuum manifold configured to be mounted on top of a reactor tube, said vacuum manifold including an arcuate elbow wall defining a plurality of openings through said arcuate elbow wall for allowing ambient air to pass through said openings when said arcuate elbow is connected to a vacuum line; said vacuum manifold also including a vertical riser configured to receive said conduit body with a close fit such that said conduit can pass through said vertical riser and through said arcuate elbow wall into the reactor tube when the manifold is mounted on the reactor tube.

15. An air lance for removing pellets from reactor tubes as recited in claim 9, wherein said rigid member comprises a plurality of rigid sub-members adapted to be brazed together at respective mating ends of said plurality of rigid sub-members.

16. An air lance for removing pellets from reactor tubes as recited in claim 15, further comprising a plurality of complementary fittings configured to matingly join said plurality of rigid sub-members adapted by brazing.

17. An air lance for removing pellets from reactor tubes as recited in claim 16, further comprising a plurality of hollow fittings each adapted to be received into and join respective ends of said plurality of rigid sub-members.

18. An air lance for removing pellets from reactor tubes comprising:
a conduit body having an inlet end defining an inlet opening, an outlet end defining a bottommost discharge opening, an outer surface, a main internal passageway from said inlet opening to said bottommost discharge opening; and
a poker fixed relative to said conduit body and projecting beyond said bottommost discharge opening to serve as both a spacer and poker;
a vacuum manifold configured to be mounted on top of a reactor tube, said vacuum manifold including an arcuate elbow wall defining a plurality of openings through said arcuate elbow wall for allowing ambient air to pass through said openings when said arcuate elbow is connected to a vacuum line; said vacuum manifold also including a vertical riser configured to receive said conduit body with a close fit such that said conduit can pass through said vertical riser and through said arcuate elbow wall into the reactor tube when the manifold is mounted on the reactor tube;

wherein a rigid member extends along said conduit body for an extended distance to said poker, such that said outlet end of said conduit body, said poker, and said rigid member may be inserted into the reactor tube, with the top of said rigid member and said inlet opening located above the reactor tube, and wherein a hammering force may be applied to the top of said rigid member to be transmitted through said rigid member to said poker for dislodging and breaking pellets.

19. An air lance for removing pellets from reactor tubes as recited in claim 18, wherein said vacuum manifold further comprises a plate extending horizontally away from said arcuate elbow wall to a downwardly-extending, compressible pin.

20. An air lance for removing pellets from reactor tubes as recited in claim 18, wherein said rigid member comprises a plurality of rigid sub-members adapted to be brazed together at respective mating ends of said plurality of rigid sub-members.

\* \* \* \* \*